United States Patent
Pham et al.

(10) Patent No.: US 8,449,633 B2
(45) Date of Patent: May 28, 2013

(54) STEAM-HYDROCARBON REFORMING WITH LIMITED STEAM EXPORT

(75) Inventors: Hoanh Nang Pham, Allentown, PA (US); Xiang-Dong Peng, Orefield, PA (US); Shankar Nataraj, Allentown, PA (US); Michael Enever, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/553,118

(22) Filed: Jul. 19, 2012

(65) Prior Publication Data
US 2012/0282145 A1  Nov. 8, 2012

Related U.S. Application Data

(62) Division of application No. 12/914,489, filed on Oct. 28, 2010, now Pat. No. 8,287,763.

(51) Int. Cl.
| B01J 7/00 | (2006.01) |
| C01B 3/36 | (2006.01) |
| C01B 6/24 | (2006.01) |
| C10J 3/08 | (2006.01) |

(52) U.S. Cl.
USPC ............... 48/61; 48/197 R; 48/62 R; 423/644

(58) Field of Classification Search
USPC .................................. 48/61, 62 R, 197 R, 210
See application file for complete search history.

(56) References Cited

U.S. PATENT DOCUMENTS

| 2,579,843 | A | 12/1951 | Mader |
| 4,479,925 | A | 10/1984 | Shires et al. |
| 4,822,521 | A | 4/1989 | Fuderer |
| 4,824,658 | A | 4/1989 | Karafian et al. |
| 4,904,455 | A | 2/1990 | Karafian et al. |
| 4,910,228 | A | 3/1990 | Lywood |
| 4,919,844 | A | 4/1990 | Wang |
| 5,006,131 | A | 4/1991 | Karafian et al. |
| 5,122,299 | A | 6/1992 | LeBlanc |
| 5,167,933 | A | 12/1992 | Norsk |
| 5,264,202 | A | 11/1993 | Snyder |
| 5,300,275 | A | 4/1994 | Lywood |
| 5,855,815 | A | 1/1999 | Park et al. |
| 6,525,104 | B2 | 2/2003 | Abbott |
| 7,087,192 | B2 | 8/2006 | Rostrup-Nielsen et al. |
| 7,707,837 | B2 * | 5/2010 | Inui et al. .................. 60/780 |

(Continued)

FOREIGN PATENT DOCUMENTS

| FR | 2897052 A1 | 8/2007 |
| JP | 5983904 | 5/1984 |

OTHER PUBLICATIONS

Littlewood, et al., "Prereforming: Based on High Activity Catalyst to Meet Market Demands", Ammonia Technical Manual, 2000.

(Continued)

*Primary Examiner* — Matthew Merkling
(74) *Attorney, Agent, or Firm* — Bryan C. Hoke, Jr.

(57) ABSTRACT

A steam-hydrocarbon reforming process and apparatus wherein reformate from a prereformer is reacted in a gas heated reformer which is heated by reformed gas from a primary reformer. Reformate from the gas heated reformer is passed to the primary reformer as feed gas.

2 Claims, 2 Drawing Sheets

U.S. PATENT DOCUMENTS

| | | |
|---|---|---|
| 7,731,935 B2 | 6/2010 | Brady et al. |
| 7,967,878 B2 * | 6/2011 | Johnston .......................... 48/61 |
| 8,268,024 B2 * | 9/2012 | Price ................................ 48/61 |
| 2002/0006968 A1 | 1/2002 | Abbott |
| 2002/0165417 A1 | 11/2002 | Numaguchi et al. |
| 2003/0110693 A1 * | 6/2003 | Drnevich et al. ............ 48/197 R |
| 2003/0110694 A1 * | 6/2003 | Drnevich et al. ............. 48/198.5 |
| 2005/0138864 A1 * | 6/2005 | Johnston et al. ............. 48/198.7 |
| 2007/0028860 A1 * | 2/2007 | Hemsath .......................... 123/3 |
| 2009/0013600 A1 * | 1/2009 | Drnevich et al. ............. 48/127.7 |
| 2009/0230359 A1 * | 9/2009 | Guvelioglu et al. .......... 252/373 |
| 2010/0264373 A1 | 10/2010 | Peng et al. |

OTHER PUBLICATIONS

Nielsen, et al., "Revamp of Ammonia Plants—A reduction of the steam/carbon ratio below the traditional level can result in a considerably higher energy efficiency", Plant/Operations Progress, vol. 1, No. 3, Jul. 1982.

* cited by examiner

STEAM-HYDROCARBON REFORMING WITH LIMITED STEAM EXPORT

CROSS-REFERENCE TO RELATED APPLICATIONS

This application is a divisional of U.S. patent application Ser. No. 12/914,489 titled "Steam-Hydrocarbon Reforming with Limited Steam Export," filed Oct. 28, 2010, the specification and claims which are incorporated by reference and made part of this application.

BACKGROUND

The present disclosure relates to steam-hydrocarbon reforming. Hydrogen and/or synthesis gas are generated by steam-hydrocarbon reforming. Steam-hydrocarbon reforming processes typically generate steam as a means to recover heat and improve the process efficiency. The present disclosure more particularly relates to steam-hydrocarbon reforming with limited or reduced steam generation as compared to conventional plants.

Synthesis gas is used to produce products such as ammonia, methanol and hydrogen. Synthesis gas is generated by high temperature processes where a lot of waste heat is available. The waste heat is generally used to generate steam and helps to improve the overall efficiency of the synthesis gas facility. In typical facilities, the amount of steam generated from the waste heat significantly exceeds the amount of steam needed for reforming of a hydrocarbon feed in a steam-hydrocarbon reformer. The excess steam is exported or may be used to generate power in a steam turbine.

However, exporting steam requires expensive pipeline systems including control and safety valves, steam traps, heat tracing, etc. Exporting steam is justified when steam is needed nearby and/or when a customer is willing to pay a reasonable price for the steam. Exporting steam can also impose constraints on plant location in order to minimize the length of the steam export piping.

Facilities for producing synthesis gas generate large amounts of steam from the waste heat. Depending on the design, overall steam production may be 35% to 200% more than required for internal use in the steam-hydrocarbon reformer. Current industry practice is to export the excess steam or to use the steam in a steam turbine for power production. Both options require additional capital expenditure and can be cost prohibitive for projects where there is no customer willing to buy the steam at a reasonable cost, or power cannot be produced competitively.

For small hydrogen production units where steam export is not justified, a portion of the excess steam is often used in the process less efficiently or vented. The hydrogen plant may be designed with less heat recovery equipment resulting in a less efficient plant.

There are a number of design options that have been used to vary the total steam production from the synthesis gas plant and reduce steam export. These design options take into account process limitations such as supplemental fuel requirements for the catalytic steam reformer.

One widely used option is to preheat the combustion air for use in the reformer to high temperature, for example up to 600° C. (1100° F.). Combustion air is typically preheated in the convection section of the reformer and can be arranged using one or two stages depending on the desired preheat temperature. Preheating the combustion air helps to reduce the amount of fuel required for combustion in the reformer. Since less fuel is used, the flow of flue gases from the reformer is reduced resulting in less waste heat.

Fuel preheating has a similar but smaller impact on overall steam production.

Another option is to use an adiabatic prereformer. An adiabatic prereformer is a vessel filled with nickel-based reforming catalyst that is located upstream of the primary reformer. A mixed feed of steam and a hydrocarbon are fed to the adiabatic prereformer at a high temperature. The prereformed product is heated again by the combustion product gases and then fed to the primary reformer.

Use of a prereformer recycles heat from the flue gas back to the process by heating the prereformer effluent stream, thus reducing the required amount of combustion fuel in the reformer. Since less fuel is used, the flow of the flue gases from the reformer is reduced resulting in less waste heat. Use of a prereformer has other benefits such as removing higher hydrocarbons from the feed stream to the primary reformer.

Facilities including a prereformer are typically cost effective since the size of the primary reformer may be reduced while maintaining high efficiency.

These methods to reduce the amount of steam are useful for cases where export steam has little or no value.

When credit for the steam produced cannot be reasonably factored in to the efficiency of the synthesis gas generating facility, methods are required to lessen the impact on plant efficiency.

There is a need to lessen the impact on plant efficiency when little or no export steam is needed or produced. It would be desirable to produce hydrogen in a reforming process while producing little or no export steam and while maintaining overall plant efficiency.

Industry desires the flexibility to design and operate steam-hydrocarbon reforming processes with limited or reduced steam export.

Industry desires steam-hydrocarbon reforming processes and equipment with improved energy efficiency.

Industry desires steam-hydrocarbon reforming processes and equipment that are reliable.

BRIEF SUMMARY

The present disclosure relates to steam-hydrocarbon reforming.

There are several aspects as outlined below.

Aspect #1. A steam-hydrocarbon reforming process comprising:
(a) introducing a reformate into a first inlet of a reactor, the reactor containing a reforming catalyst, the reformate having a first inlet temperature ranging from 550° C. to 725° C. or ranging from 600° C. to 700° C., reacting the reformate in the presence of the reforming catalyst under reaction conditions sufficient to form additional hydrogen in the reformate, and withdrawing the reformate from a first outlet of the reactor at a first outlet temperature ranging from 575° C. to 725° C.;
(b) introducing a reformed gas into a second inlet of the reactor at a second inlet temperature ranging from 800° C. to 975° C., transferring heat from the reformed gas to the reformate in the reactor, and withdrawing the reformed gas from a second outlet of the reactor at a second outlet temperature ranging from 675° C. to 925° C. or ranging from 700° C. to 850° C.;
(c) introducing a reformer feed gas comprising at least a portion of the reformate from the first outlet of the reactor into a plurality of reformer tubes containing a second reforming catalyst, reacting the reformate in the presence of the second reforming catalyst under reaction conditions sufficient to form the reformed gas containing hydrogen, and withdrawing the reformed gas from the plurality of reformer tubes; and (d) introducing an oxidant gas mixture containing oxygen and a fuel into a combustion section of a reformer, combusting the fuel and the oxygen to form combustion product gases and generate heat to supply energy for reacting the reformate in the plurality of reformer tubes, and withdrawing the combustion product gases from the combustion section;

wherein the reactor is provided with a heat transfer surface area, the heat transfer surface area for exchanging heat indirectly between the reformate and the reformed gas during the reacting of the reformate in the reactor wherein the heat transfer surface area is effective to decrease the temperature of the reformed gas from the second inlet temperature ranging from 800° C. to 975° C. to the second outlet temperature ranging from 675° C. to 925° C. or ranging from 700° C. to 850° C. and to maintain the first outlet temperature of the reformate between 575° C. and 725° C.

Aspect #2. The process of aspect #1 wherein the reaction conditions sufficient to form additional hydrogen in the reformate include a temperature ranging from 575° C. to 725° C. and a pressure ranging from 500 kPa to 5000 kPa, and wherein the reaction conditions sufficient to form the reformed gas include a temperature ranging from 650° C. to 1000° C. and a pressure ranging from 500 kPa to 5000 kPa.

Aspect #3. The process of aspect #1 or aspect #2 wherein the reformate has less than 0.005 mole % C2 or higher hydrocarbons.

Aspect #4. The process of any one of aspects #1 to #3 further comprising passing the reformate and the reformed gas co-currently in the reactor.

Aspect #5. The process of any one of aspects #1 to #4 wherein the reformer feed gas comprises 90 to 100% on a molar flow rate basis of the reformate from the first outlet of the reactor.

Aspect #6. The process of any one of aspects #1 to #4 wherein the reformer feed gas comprises all of the reformate from the first outlet of the reactor.

Aspect #7. The process of any one of aspects #1 to #5 wherein at least 90% on a molar flow rate basis of the reformer feed gas is reformate from the first outlet of the reactor.

Aspect #8. The process of any one of aspects #1 to #4 wherein the reformer feed gas consists of all of the reformate from the first outlet of the reactor.

Aspect #9. The process of any one of aspects #1 to #8 wherein the reforming catalyst comprises at least one metal selected from the group consisting of nickel, cobalt, platinum, palladium, rhodium, ruthenium and iridium.

Aspect #10. The process of any one of aspects #1 to #9 further comprising:

heating a feed gas comprising steam and at least one hydrocarbon selected from the group consisting of C1 to C6 hydrocarbons by indirect heat exchange with the combustion product gases;

passing at least a portion of the heated feed gas over a third reforming catalyst, and reacting the at least a portion of the heated feed gas in the presence of the third reforming catalyst under reaction conditions sufficient to react the at least a portion of the heated feed gas thereby forming a first reformate; and heating at least a portion of the first reformate by indirect heat exchange with the combustion product gases thereby forming the reformate introduced into the first inlet of the reactor.

Aspect #11. The process of aspect #10 wherein the reaction conditions sufficient to react the at least a portion of the heated feed gas include a temperature ranging from 450° C. to 600° C. and a pressure ranging from 500 kPa to 5000 kPa.

Aspect #12. The process of aspect #10 or aspect #11 wherein the reaction conditions are substantially adiabatic.

Aspect #13. The process of any one of aspects #10 to #12 wherein the steam-to-carbon molar ratio of the feed gas is between 1.8 and 2.8.

Aspect #14. The process of any one of aspects #1 to #13 wherein no sulfur compounds are removed from the reformed gas after withdrawing the reformed gas from the second outlet of the reactor.

Aspect #15. An apparatus for performing the steam-hydrocarbon reforming process of any one of aspects #1 to #14, the apparatus comprising:

a prereformer and a heat exchanger for forming the reformate;

a reformer having the combustion section including burners for introducing the oxidant gas mixture and the fuel into the combustion section of the reformer, the reformer comprising the plurality of reformer tubes containing the second reforming catalyst, each of the plurality of reformer tubes having an inlet end and an outlet end; and a reactor having the first inlet in downstream fluid flow communication with the prereformer for receiving the reformate from the prereformer, the reactor containing the reforming catalyst, the reactor having the first outlet in upstream fluid flow communication with the inlet ends of the plurality of reformer tubes, the reactor having the second inlet in downstream fluid flow communication with the outlet ends of the plurality of reformer tubes for receiving the reformed gas from the plurality of reformer tubes, the reactor having the second outlet for withdrawing the reformed gas at the second outlet temperature, and the reactor having the heat transfer surface area for exchanging heat indirectly between the reformate and the reformed gas wherein the heat transfer surface area is effective to decrease the temperature of the reformed gas from the second inlet temperature ranging from 800° C. to 975° C. to the second outlet temperature ranging from 675° C. to 925° C. or ranging from 700° C. to 850° C. and to maintain the first outlet temperature of the reformate between 575° C. and 725° C. when the reformate is introduced into the first inlet of the reactor at the first inlet temperature ranging from 575° C. to 725° C. or ranging from 600° C. to 700° C.

Aspect #16. The apparatus according to aspect #15, wherein the apparatus is used to perform the process of any one of aspects #1 to #14.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The phrase "at least a portion" means "a portion or all." The at least a portion of a stream may have the same composition as the stream from which it is derived. The at least a portion of a stream may include specific components of the stream from which it is derived.

As used herein, "in fluid flow communication" means operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

"Downstream" and "upstream" refer to the intended flow direction of the process fluid transferred. If the intended flow direction of the process fluid is from the first device to the second device, the second device is in downstream fluid flow communication of the first device.

As used herein, the term "catalyst" refers to the catalytic material as well as any support for the catalytic material.

The present disclosure relates to catalytic steam-hydrocarbon reforming.

Catalytic steam-hydrocarbon reforming, also called catalytic steam reforming, steam methane reforming (SMR), or simply steam reforming, is defined as any process used to convert reformer feedstock to synthesis gas by reaction of a hydrocarbon and steam over a catalyst. The term "synthesis gas," commonly called syngas, is used herein to mean any mixture comprising hydrogen and carbon monoxide. The reforming reaction is an endothermic reaction and may be described generally as

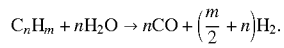

Hydrogen is generated when synthesis gas is generated.

Figure 1:
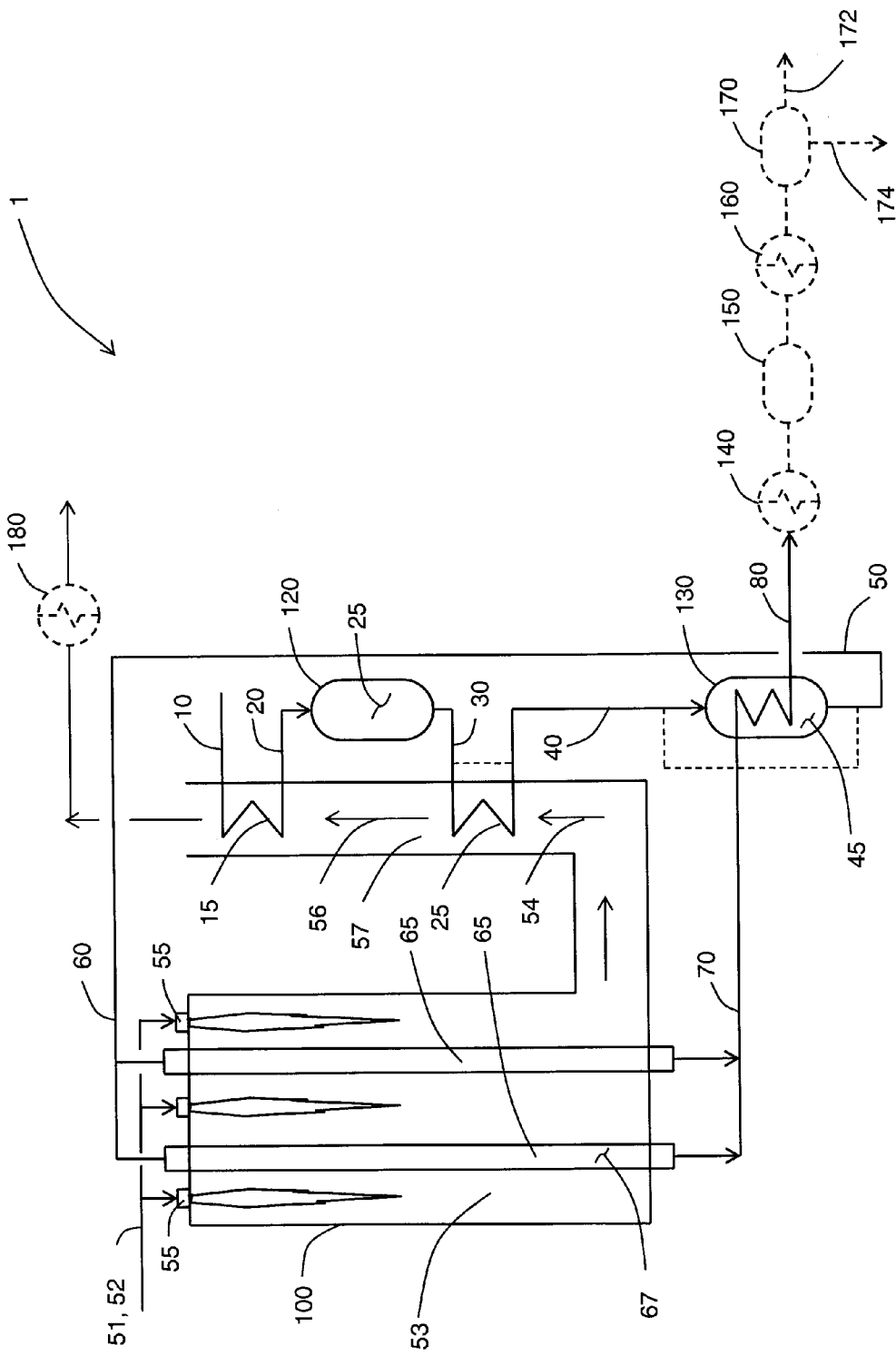
FIG. 1 is a process schematic for a steam-hydrocarbon reforming process and apparatus including a steam-hydrocarbon catalytic reformer, prereformer, and gas heat exchange reformer.

The steam-hydrocarbon reforming process is described with reference to FIG. 1, showing an exemplary process flow diagram 1 for carrying out the process.

The process comprises introducing reformate 40 into a first inlet of reactor 130 containing reforming catalyst 45. Reformate 40 is introduced into the first inlet of reactor 130 with a first inlet temperature ranging from 550° C. to 725° C. or ranging from 600° C. to 700° C. The first inlet temperature is a temperature of reformate 40 measured at the first inlet. Reformate 40 is reacted in the presence of reforming catalyst 45 under reaction conditions sufficient to form additional hydrogen in reformate 50. Reaction conditions sufficient to form additional hydrogen in the reformate may include a temperature ranging from 575° C. to 725° C. and a pressure ranging from 500 kPa to 5000 kPa. Reformate 50 is withdrawn from a first outlet of reactor 130 at a first outlet temperature ranging from 575° C. to 725° C. The first outlet temperature is the temperature of reformate 50 at the first outlet.

A reformate is any mixture that contains products of the reforming reaction and generally will contain unreacted reactants such as methane and steam. Reformate 40 may have low concentrations of C2 or higher hydrocarbons. Reformate 40 may have less than 0.005 mole % C2 or higher hydrocarbons. In order to obtain low concentrations of C2 or higher hydrocarbons in reformate 40, a feedstock containing C1 to C6 hydrocarbons may be reformed with steam in a prereformer.

Reformate 40 may be effluent from a prereformer. A "prereformer" is a reforming reactor that precedes the primary reformer. A "prereformer" is used to convert feedstock containing elemental hydrogen and elemental carbon into synthesis gas by reaction with steam over a catalyst with or without heating. A prereformer may be an adiabatic fixed bed reactor. A prereformer may be a tubular reactor. A prereformer generally employs a different type of catalyst than a primary reformer, for example a high activity, high nickel content catalyst. Temperatures in a prereformer may be in the range of about 450° C. to about 600° C. Heat to a prereformer may be provided from exhaust gases from a reformer or other source, but is typically characterized by the lack of direct radiation heating by a combustion flame. A prereformer and a reformer may be physically connected.

Prereformers are known in the art. Suitable materials and methods of construction are known. The advantage of using a prereformer is to convert most or all of the heavy hydrocarbons (i.e. C2+ hydrocarbons) in the feed to hydrogen and carbon oxides, thereby reducing the potential of coke formation in the primary reformer. Another advantage of using the prereformer is to utilize the waste heat to produce hydrogen and carbon oxides, and thereby lower the heat duty requirement in the primary reformer and reduce the amount of excess steam produced.

A prereformer may be distinguished from the primary reformer in that a greater proportion of the conversion of the hydrocarbons fed to the process is realized in the primary reformer than the prereformer.

FIG. 1 shows an exemplary embodiment where reformate 40 is formed in prereformer 120. Feed gas 10 comprising steam and at least one hydrocarbon selected from the group consisting of C1 to C6 hydrocarbons is heated by indirect heat exchange with combustion product gases 56 in convection section 57 of primary reformer 100 thereby forming heated feed gas 20.

The steam-to-carbon molar ratio of feed gas 10 may be between 1.8 and 2.8. The steam-to-carbon molar ratio is a conventional term in the fields of hydrogen production and synthesis gas production. The steam-to-carbon molar ratio (S/C ratio) is defined as the (overall) ratio of the moles of steam to moles of carbon atoms in the hydrocarbons in the feed(s) to the reformer. For example if the molar flow rate of steam is 6 moles/s, the molar flow rate of methane is 1 mole/s and the molar flow rate of ethane is 1 mole/s, the steam-to-carbon molar ratio is 2.0. 1 mole/s of methane provides 1 mole of carbon per second and 1 mole/s of ethane provides 2 moles of carbon per second. The advantage of using a lower steam-to-carbon ratio is to improve the overall efficiency of the steam-hydrocarbon reforming process.

Heated feed gas 20 is passed over reforming catalyst 25 and reacted in the presence of reforming catalyst 25 under reaction conditions sufficient to react heated feed gas 20 thereby forming reformate 30. Reaction conditions sufficient to react heated feed gas 20 may include a temperature ranging from 450° C. to 600° C. and a pressure ranging from 500 kPa to 5000 kPa. Prereformer 120 may be an adiabatic prereformer. The reaction conditions for forming the reformate 30 may be substantially adiabatic. Reformate 30 is heated by indirect heat exchange with combustion product gases 54 in the convection section 57 of reformer 100 to form reformate 40 that is introduced into the first inlet of reactor 130.

Reactor 130 contains reforming catalyst 45. Reforming catalyst 45 may be any suitable reforming catalyst known in the art. The catalytic material of reforming catalyst 45 may be one or more metals selected from nickel, cobalt, platinum, palladium, rhodium, ruthenium, and iridium. Reforming catalyst 45 may be a supported catalyst where the support comprises one or more of high temperature stable alumina, calcium aluminate, and magnesium aluminate. Reforming catalysts are well-known and available commercially, and suitable catalysts may be readily selected without undue experimentation.

Reforming catalyst 45 may also be a structured packing catalyst. Catalyst material may be applied to the structured packing catalyst by a washcoat process.

As shown in FIG. 1, reformed gas 70 is introduced into a second inlet of reactor 130. According to the process, reformed gas 70 is introduced at a second inlet temperature ranging from 820° C. to 970° C. The second inlet temperature is the temperature of reformed gas 70 at the second inlet of reactor 130. Heat is transferred from reformed gas 70 to reformate 40 by indirect heat transfer in reactor 130. Reformate 40 and reformed gas 70 may be passed co-currently in reactor 130. Co-current flow, also called concurrent flow or parallel flow is where the streams flow generally in the same direction through the device. Co-current flow may be contrasted to countercurrent flow, where the streams flow generally in the opposite direction of each other through the device. Co-current flow may also be contrasted with cross-flow, where one of the streams flows generally perpendicular to the other stream.

Reformed gas 80 is withdrawn from a second outlet of reactor 130 at a second outlet temperature ranging from 675° C. to 925° C. or ranging from 700° C. to 850° C. The second outlet temperature is the temperature of reformed gas 80 at the second outlet of reactor 130.

The process comprises introducing reformer feed gas 60 into a plurality of reformer tubes 65 containing a second reforming catalyst 67. Primary reformer 100 includes the plurality of reformer tubes 65 in the combustion section 53 of the primary reformer 100. Reformer feed gas 60 comprises at least a portion of reformate 50 from the first outlet of reactor 130. The reformer feed gas 60 may comprise 90 to 100% on a molar basis of reformate 50 from the first outlet of reactor 130, with a small portion of reformation 50 being used for another purpose (not shown). The reformer feed gas 60 may comprise all of the reformate 50 from the outlet of reactor 130. At least 90% on a molar flow rate basis of the reformer feed gas 60 may be reformate 50 from the first outlet of reactor 130 with another portion provided from another source (not shown). The reformer feed gas 60 may consist of all of the reformate from the first outlet of reactor 130.

The feed gas 60 including reformate 50 is reacted in the presence of reforming catalyst 67 under reaction conditions sufficient to form reformed gas 70 containing hydrogen. Reaction conditions sufficient to form reformed 70 gas include a temperature ranging from 650° C. to 1000° C. and a pressure ranging from 500 kPa to 5000 kPa. Reformed gas 70 is withdrawn from the plurality of reformer tubes 65.

Reformer tubes are known in the art. Fabrication of reformer tubes is known in the art.

Reforming catalyst 67 may be any suitable reforming catalyst known in the art. Reforming catalyst 67 may be the same as or different than reforming catalyst 45. Reforming catalysts are well-known and available commercially, and suitable catalysts may be readily selected without undue experimentation.

The process comprises introducing fuel 52 and oxidant gas mixture 51 containing oxygen into combustion section 53 of reformer 100. Oxidant gas mixture 51 and fuel 52 are introduced through burners 55. Reformer 100 may be a downfired furnace as shown in FIG. 1, a side-fired furnace (not shown), an up-fired furnace (not shown), or any suitable combination. Oxidant gas mixture 51 and fuel 52 may be introduced separately through burners 55 and/or premixed. Fuel and/or oxidant may be lanced (i.e. staged) into the combustion section. The fuel may be any suitable fuel known in the art. For example the fuel may comprise at least one of by-product gas from a pressure swing adsorber, natural gas, refinery fuel gas, waste fuel of a nearby process, etc. Oxidant gas mixture 51 may be any suitable oxidant gas, for example air, industrial oxygen, oxygen-enriched air, or oxygen-depleted air. The oxidant gas mixture may be heated by indirect heat exchange with combustion product gases in the convection section of the reformer 100. Fuel and oxygen are combusted in combustion section 53 to form combustion product gases 54 thereby generating heat to supply energy for reacting the feed gas comprising the reformate in the plurality of reformer tubes 65. The combustion product gases 54 are withdrawn from the combustion section 53.

Construction and operation of reformers containing reformer tubes for the production of hydrogen and/or synthesis gas is well-known.

Reactor 130 is provided with a heat transfer surface area. The heat transfer surface area exchanges heat indirectly between reformate 40 and reformed gas 70 during the reacting of the reformate in reactor 130. The amount of heat transfer surface area is effective to decrease the temperature of reformed gas 70 from the second inlet temperature ranging from 800° C. to 975° C. to the second outlet temperature ranging from 675° C. to 925° C. or ranging from 700° C. to 850° C. and to maintain the first outlet temperature of reformate 50 between 575° C. and 725° C.

While it is conventional to maximize heat transfer from the reformed gas from the reformer to increase the efficiency of the process and avoid generating additional export steam, the inventors have discovered that limiting the heat transfer surface area in the reactor thereby maintaining the temperatures in reactor as described above provides the advantage of avoiding metal dusting in the reactor while capturing a majority of the efficiency benefit.

Design, selection of materials, construction and operation of the reactor with suitable heat transfer surface area may be readily realized by the skilled person having knowledge of this disclosure.

Since metal dusting is avoided by operating according to the process, no introduction of sulfur compounds is required to avoid metal dusting as was done in the prior art. Accordingly, the process may be performed with no sulfur compounds being removed from the reformed gas 80 after withdrawing reformed gas 80 from the second outlet of reactor 130. This provides the advantage of avoiding equipment required for sulfur removal.

With reference to FIG. 1, an apparatus for performing the steam-hydrocarbon reforming process comprises prereformer 120 and heat exchangers 15 and 25 for forming the reformate 40. The apparatus also comprises a reformer 100 having combustion section 53 including burners 55 for introducing oxidant gas mixture 51 and fuel 52 into combustion section 53. The reformer 100 comprises the plurality of reformer tubes 65 containing reforming catalyst 67, each of the plurality of reformer tubes 65 having an inlet end and an outlet end.

The apparatus also comprises reactor 130 having the first inlet in downstream fluid flow communication with prereformer 120 via heat exchanger 25 for receiving the reformate 40 from prereformer 120. Reactor 130 contains reforming catalyst 45. The first outlet of reactor 130 is in upstream fluid flow communication with the inlet ends of the plurality of reformer tubes 65. The second inlet of reactor 130 is in downstream fluid flow communication with the outlet ends of the plurality of reformer tubes 65 for receiving the reformed gas 70 from the plurality of reformer tubes 65. Reactor 130 has a second outlet for withdrawing the reformed gas 80 at the second outlet temperature. Reactor 130 has the heat transfer surface area for exchanging heat indirectly between the reformate and the reformed gas wherein the heat transfer surface area is effective to decrease the temperature of the reformed gas from the second inlet temperature ranging from 800° C. to 975° C. to the second outlet temperature ranging from 675° C. to 925° C. or ranging from 700° C. to 850° C. and to maintain the first outlet temperature of the reformate between 575° C. and 725° C. when the reformate is introduced into the first inlet of reactor 130 at the first inlet temperature ranging from 550° C. to 725° C. or ranging from 600° C. to 700° C.

As shown in FIG. 1, reformed gas 80 may be optionally processed to recover heat and/or provide a purified hydrogen product 172. Reformed gas 80 may be passed to boiler 140 to generate steam by indirect heat transfer. The cooled reformed gas 80 may be passed to water-gas shift reactor 150 to convert CO to $CO_2$ with the concurrent production of more hydrogen. One or more shift reactors may be used. Shift reactors are well-known. The shift may be high temperature, medium temperature, or low temperature shift. Reformed gas 80 may be further cooled in heat exchanger 160 before being passed to pressure swing adsorber 170. Reformed gas 80 is separated in pressure swing adsorber 170 to produce hydrogen product stream 172 and by-product stream 174. By-product stream 174 may be used as fuel 52 in the reformer 100.

The configuration of downstream processing depends on the product produced, e.g. hydrogen or synthesis gas. Details of downstream processing also depends on producer preferences.

EXAMPLES

Several examples were simulated using the commercial process simulation software, Aspen Plus®.

In each of the examples, natural gas is used for feed to the prereformer and as supplemental fuel for combustion in the reformer. The supplemental fuel for combustion in the reformer is sometimes called "trim fuel." The majority of the fuel for combustion in the reformer is by-product gas 174, 374 from pressure swing adsorber 170. The same composition of natural gas is used in each of the examples.

The results include the ratio of steam used for reforming, S, to the total steam produced in the process, $S/S_T$, and the normalized net specific energy and the normalized gross specific energy. The total steam produced, $S_T$, is the total steam produced having a pressure greater than 2 MPa. Low grade steam having a pressure less than 2 MPa is not included in $S_T$. Any excess steam produced over the amount used for reforming may be exported to another process and is termed "export steam."

The overall efficiency of the process may be evaluated based on the gross specific energy and/or the net specific energy. In general terms, the gross specific energy is the energy required to make an amount of hydrogen and the net specific energy is the energy required to make an amount of hydrogen taking credit for the steam produced as energy. The definitions are provided below.

The gross specific energy, GSE, is the sum of the Higher Heating Value ($J/Nm^3$) of the supplemental fuel, $HHV_{fuel}$, introduced into the combustion section multiplied by the flow rate of the fuel ($Nm^3/h$), $F_{fuel}$ and the Higher Heating Value ($J/Nm^3$) of the reformer feedstock, $HHV_{feed}$, introduced into the reformer multiplied by the flow rate of the reformer feedstock ($Nm^3/h$), $F_{feed}$, the sum divided by the hydrogen production rate ($Nm^3/h$), HPR, expressed in the units $J/Nm^3$; mathematically $$GSE = \frac{HHV_{fuel} * F_{fuel} + HHV_{feed} * F_{feed}}{HPR}.$$

The net specific energy, NSE, is the Higher Heating Value ($J/Nm^3$) of the supplemental fuel, $HHV_{fuel}$, introduced into the combustion section multiplied by the flow rate of the fuel ($Nm^3/h$), $F_{fuel}$, plus the Higher Heating Value ($J/Nm^3$) of the reformer feedstock, $HHV_{feed}$, introduced into the reformer multiplied by the flow rate of the reformer feedstock ($Nm^3/h$), $F_{feed}$, minus the enthalpy difference between the export steam and water at 25° C., ΔH, in J/kg multiplied by the mass flow of the export steam, $F_{steam}$, in kg/h, all divided by the hydrogen production rate ($Nm^3/h$), HPR, expressed in the units $J/Nm^3$; mathematically $$NSE = \frac{HHV_{fuel} * F_{fuel} + HHV_{feed} * F_{feed} - \Delta H * F_{steam}}{HPR}.$$

The gross specific energy is always greater than or equal to the net specific energy since no credit is given for the export steam. The gross and net specific energies are equal when no steam is exported.

All of the specific energy results in Table 1 are normalized with respect to the net specific energy of Example 1, the net specific energy of Example 1 given a basis value of 100.

Example 1

Comparative Example

Figure 2:
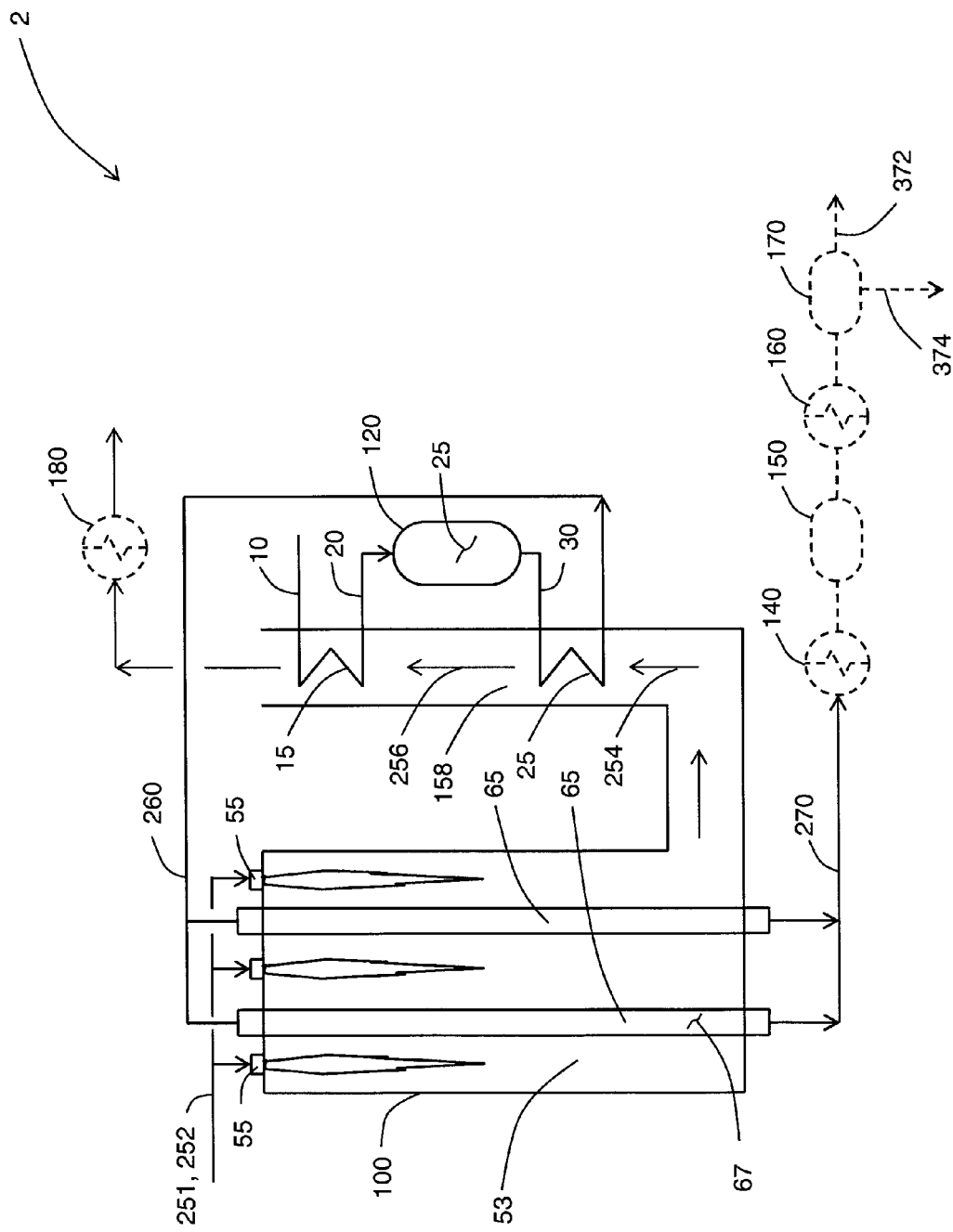
FIG. 2 is a process schematic for a steam-hydrocarbon reforming process and apparatus including a steam-hydrocarbon catalytic reformer, and prereformer.

FIG. 2 illustrates a process flow diagram 2 for a prior art configuration.

Prereformer feed gas 10 consisting of steam and natural gas with a steam-to-carbon molar ratio of 2.5 is heated in heat exchanger 15 and the heated prereformer feed gas 20 is reacted in prereformer 120 over prereformer catalyst 25. Reformate 30 is withdrawn from the prereformer 120 and heated in heat exchanger 25 to form a heated reformate which is passed to the plurality of reformer tubes 65 as reformer feed gas 260. Reformer feed gas 260 is reacted over reforming catalyst 67 and withdrawn from the plurality of reformer tubes 65 as reformed gas 270. Reformed gas 270 is passed to boiler 140 to generate steam thereby cooling reformed gas 270. The cooled reformed gas 270 is passed to shift reactor 150 to convert CO to $CO_2$ and form additional $H_2$ in the reformed gas. The shifted reformed gas is passed to air cooler 160 to condense out water and prepare the reformed gas pressure swing adsorber 170. The reformed gas is separated in pressure swing adsorber 170 to form hydrogen product 372 and pressure swing adsorber by-product 374.

Fuel 252 and air 251 are introduced into the reformer 100 via burners 55 and combusted to provide heat for the reforming reaction in the plurality of reforming tubes 65. Fuel 252 comprises pressure swing adsorber by-product 374 and supplemental fuel. The supplemental fuel is natural gas. Air is preheated by heat exchange with the combustion product gases in a single stage in the convection section 158 of reformer 100. Prereformer feed gas 10 is heated by indirect heat exchange with the combustion product gases 256 in heat exchanger 15. Reformate 30 is heated by indirect heat exchange with the combustion product gases 254 in heat exchanger 25. After the combustion product gases have heated prereformer feed gas 10, reformate 30, and combustion air 251, the combustion product gases are passed to boiler 180 to generate steam.

The process according to example 1 is optimized to provide the lowest net specific energy, NSE, taking credit for export steam, by maximizing steam production via heat recovery from the reformed gas in boiler 140 as well as from the combustion product gases in boiler 180. The optimum is obtained at a combustion air preheat temperature provided by a single stage air preheat. The results are summarized in Table 1.

The ratio of steam used for reforming to the total steam produced in the process, $S/S_T$, is 0.45. It means that the process produces more than 2 times the amount needed in the process for reforming.

The process stream 260 entering catalyst-containing reformer tubes 65 will have a mole fraction ratio, R, where $$R = \frac{Y_{CH_4}}{(Y_{H_2} + 0.5 * Y_{CO_2})},$$

where $Y_{CH_4}$ is the mole fraction of methane in the process stream, $Y_{H_2}$ is the mole fraction of hydrogen in the process stream, and $Y_{CO_2}$ is the mole fraction of carbon dioxide in the process stream. The inventors have found that the mole fraction ratio of the stream introduced into the catalyst-containing tubes in a fired reformer provides an indication of the tendency for carbon formation on the reforming catalyst in the catalyst containing tubes.

Lower values of mole fraction ratio, R, correspond to a lower propensity for carbon formation on the catalyst in the reformer tubes.

Example 1 has a mole fraction ratio, R=2.86.

The process according to example 1 is normalized to have an NSE of 100. The GSE for example 1 is 119.

Example 2

Comparative Example with Reduced Steam Export

The process flow diagram in FIG. 2 also applies for Example 2. The amount of steam formed is decreased by increasing the air preheat temperature. The air preheat temperature is increased by preheating the air in two stages. Example 1 has a single stage of air preheat, whereas example 2 has two stages of air preheat. Otherwise example 2 is the same as example 1. The process was optimized for an air preheat temperature provided by the two-stage air preheat to achieve the lowest Net Specific Energy while keeping the mole fraction ratio, R, the same as in example 1.

The steam-to-carbon molar ratio, S/C, for example 2 was essentially the same as for example 1.

The amount of excess steam produced in example 2 was significantly less than for example 1 as demonstrated by the ratio of steam used for reforming to the total steam produced in the process, $S/S_T$. $S/S_T$ for example 2 is 0.64 compared to 0.45 for example 1.

While the net specific energy is increased from 100 for example 1 to 101.3 for example 2, the gross specific energy is decreased from 118.9 for example 1 to 110.2 for example 2, showing that the prior art process can be modified to reduce the impact of unneeded or less valued export steam by increasing the air preheat temperature.

Example 3

Gas Heat Exchange Reformer and Reduced Steam Export

FIG. 1 illustrates a process flow diagram 1 for example 3. Like example 2, example 3 also uses two stages of air preheat.

Example 3 includes the gas heat exchange reformer 130 and the process was optimized to provide the lowest net specific energy, NSE, for a specified reformate inlet temperature of 649° C. and a specified reformed gas outlet temperature of 788° C. while keeping the mole fraction ratio, R, less than those in examples 1 and 2. The mole fraction ratio, R, for example 3 was not maintained at the same value as for examples 1 and 2 because the supplemental fuel value goes to zero in the optimization, which is a situation those skilled in the art know to avoid. The mole fraction ratio, R, is affected by the steam-to-carbon molar ratio, which can be reduced to 2.3 while providing a mole fraction ratio, R, of about 1.12. The temperatures in and out of the gas heat exchange reformer 130 are limited according to the claimed invention.

Prereformer feed gas 10 consisting of steam and methane with a steam-to-carbon molar ratio of 2.3 is heated in heat exchanger 15 and the heated prereformer feed gas 20 is reacted in prereformer 120 over prereformer catalyst 25. For this example, prereformer 120 is adiabatic. Use of prereformer 120 and reactor 130 according to the present process allows the use of a lower steam-to-carbon molar ratio without increased carbon formation risk as exemplified by a lower mole fraction ratio, R, compared to examples 1 and 2. Reformate 30 is withdrawn from prereformer 120 and heated in heat exchanger 25 by indirect heat exchange with combustion product gases 54 in the convection section 57 of reformer 100 to form a heated reformate 40.

The heated reformate 40 is passed to the reactor 130 and reacted in reactor 130 over reformer catalyst 45 to form additional hydrogen in reformate 50. Reformate 50 is passed to the plurality of reformer tubes 65 as reformer feed gas 60. Reformer feed gas 60 is reacted over reforming catalyst 67 and withdrawn from the plurality of reformer tubes 65 as reformed gas 70. Reformed gas 70 is passed to reactor 130 to provide heat for the reaction of reformate 40 and is withdrawn from reactor 130 as reformed gas 80. Heat is transferred from reformed gas 70 to reformate 40 by indirect heat transfer in reactor 130. Reformate 40 and reformed gas 70 are passed co-currently with one another in reactor 130. Reformed gas 80 is passed to boiler 140 to generate steam thereby cooling reformed gas 80. The cooled reformed gas 80 is passed to shift reactor 150 to convert CO to $CO_2$ and form additional $H_2$ in the reformed gas. The shifted reformed gas is passed to air cooler 160 to condense out water and prepare the reformed gas pressure swing adsorber 170. The reformed gas is separated in pressure swing adsorber 170 to form hydrogen product 172 and pressure swing adsorber by-product 174.

Fuel 52 and air 51 are introduced into the reformer 100 via burners 55 and combusted to provide heat for the reforming reaction in the plurality of reforming tubes 65. Air is preheated by heat exchange with the combustion product gases in the convection section 57 of reformer 100. Prereformer feed gas 10 is heated by indirect heat exchange with the combustion product gases 56 in heat exchanger 15. Reformate 30 is heated by indirect heat exchange with the combustion product gases 54 in heat exchanger 25. After the combustion product gases have heated prereformer feed gas 10, reformate 30, and combustion air 51, the combustion product gases are passed to boiler 180 to generate steam.

The process according to example 3 provides a higher air preheat temperature than example 1 to reduce the amount of export steam. The air preheat temperature for example 3 is less than for example 2, but still less export steam is produced in example 3 as compared to example 2. Steam is produced via heat recovery from the reformed gas in boiler 140 as well as from the combustion product gases in boiler 180. Results from the model are summarized in Table 1.

The amount of excess steam produced in example 3 is significantly less than for example 1 as demonstrated by the ratio of steam used for reforming to the total steam produced in the process, $S/S_T$. $S/S_T$ for example 3 is 0.65 compared to 0.45 for example 1. The amount of excess steam produced in example 3 is comparable to the amount of excess steam for example 2.

However the net specific energy for example 3 is less than the net specific energy for examples 1 and 2. Also the gross specific energy for example 3 is less than the gross specific energy for either of examples 1 and 2. Example 3 illustrates how the use of the gas heated reformer, reactor 130, improves the efficiency of the process especially when the demand for export steam is low.

As stated above, the temperatures in and out of the gas heated reformer, reactor 130, were limited to the claimed ranges in example 3 and are summarized in Table 2. The temperature of stream 40 is designated T40, the temperature of stream 50 is designated T50, etc.

Example 4

Gas Heat Exchange Reformer and Reduced Steam Export

FIG. 1 illustrates a process flow diagram 1 for example 4. Example 4 also includes two stages of air preheat.

Example 4 is similar to example 3 except that the temperatures in and out of the gas heated reformer, reactor 130, were outside of the claimed ranges. The process was optimized to provide the lowest net specific energy, NSE, for a specified reformate inlet temperature of 538° C. and a specified reformed gas outlet temperature of 593° C. while keeping the mole fraction ratio, R, less than those in examples 1 and 2. Compared to example 3, the process of example 4 increases the heat duty of the gas heated reformer, reactor 130. The specified reformate inlet temperature and specified reformed gas outlet temperature are selected outside the claimed range. The mole fraction ratio, R, for example 4 was not maintained at the same value as for examples 1 and 2 because the supplemental fuel value goes to zero in the optimization, which is a situation those skilled in the art know to avoid. The mole fraction ratio, R, is affected by the steam-to-carbon molar ratio, which can be reduced to 2.3 while providing a mole fraction ratio, R, of about 0.85. The temperatures in and out of the gas heat exchange reformer 130 were not limited according to the claimed invention and are outside the range required by the claimed process.

The process according to example 4 provides a higher air preheat temperature than example 1 to reduce the amount of export steam. The air preheat temperature for example 4 is less than for example 2 and less than example 3, but still less export steam is produced in example 4 as compared to either example 2 or 3. Steam is produced via heat recovery from the reformed gas in boiler 140 as well as from the combustion product gases in boiler 180. Results from the model are summarized in Table 1.

The amount of excess steam produced in example 4 is significantly less than for example 1 as demonstrated by the ratio of steam used for reforming to the total steam produced in the process, $S/S_T$. $S/S_T$ for example 4 is 0.68 compared to 0.45 for example 1.

As stated above, the temperatures in and out of the gas heated reformer, reactor 130, were not limited in example 4 and are summarized in Table 2. The temperature of stream 40 is designated T40, the temperature of stream 50 is designated T50, etc.

The net specific energy for example 4 is less than the net specific energy for any of examples 1, 2, and 3. Also the gross specific energy for example 4 is less than the gross specific energy for any of examples 1, 2, and 3. Example 4 illustrates how the use of the gas heated reformer, reactor 130, improves the efficiency of the process especially when export steam is not needed.

While the efficiency of example 4 is better than the efficiency calculated for example 3, the inventors have discovered that such operation may lead to higher risk of metal dusting in reactor 130. The operation of the process according to example 3 therefore provides sufficient improvement of efficiency while maintaining reliability of the equipment.

Although the present invention has been described as to specific embodiments or examples, it is not limited thereto, but may be changed or modified into any of various other forms without departing from the scope of the invention as defined in the accompanying claims.

TABLE 1

|  | Example 1 | Example 2 | Example 3 | Example 4 |
| --- | --- | --- | --- | --- |
| S/C | 2.5 | 2.5 | 2.3 | 2.3 |
| $S/S_T$ | 0.45 | 0.64 | 0.65 | 0.68 |
| R | 2.86 | 2.86 | 1.12 | 0.85 |
| Net Specific Energy | 100 | 101.3 | 99.3 | 99.2 |
| Gross Specific Energy | 118.9 | 110.2 | 107.6 | 106.3 |
| Air Preheat Temperature (° C.) | 267 | 532 | 448 | 392 |

TABLE 2

|  | Example 3 | Example 4 |
| --- | --- | --- |
| T40 (° C.) | 649 | 538 |
| T50 (° C.) | 615 | 654 |
| T70 (° C.) | 867 | 867 |
| T80 (° C.) | 788 | 593 |

The invention claimed is:

1. An apparatus for performing a steam-hydrocarbon reforming process comprising:
   (a) introducing a reformate into a first inlet of a reactor, the reactor containing a reforming catalyst, the reformate having a first inlet temperature, the first inlet temperature ranging from 550° C. to 725° C., reacting the reformate in the presence of the reforming catalyst under reaction conditions sufficient to form additional hydrogen in the reformate, and withdrawing the reformate from a first outlet of the reactor at a first outlet temperature, the first outlet temperature ranging from 575° C. to 725° C.;

(b) introducing a reformed gas into a second inlet of the reactor at a second inlet temperature, the second inlet temperature ranging from 800° C. to 975° C., passing the reformed gas co-currently to the reformate in the reactor, transferring heat from the reformed gas to the reformate in the reactor, and withdrawing the reformed gas from a second outlet of the reactor at a second outlet temperature, the second outlet temperature ranging from 675° C. to 925° C.;

(c) introducing a reformer feed gas comprising at least a portion of the reformate from the first outlet of the reactor into a plurality of reformer tubes containing a second reforming catalyst, reacting the reformate in the presence of the second reforming catalyst under reaction conditions sufficient to form the reformed gas containing hydrogen, and withdrawing the reformed gas from the plurality of reformer tubes; and (d) introducing an oxidant gas mixture containing oxygen and a fuel into a combustion section of a reformer, combusting the fuel and the oxygen to form combustion product gases and generate heat to supply energy for reacting the reformate in the plurality of reformer tubes, and withdrawing the combustion product gases from the combustion section;

the apparatus comprising:

a prereformer and a heat exchanger for forming the reformate;

the reformer having the combustion section including burners for introducing the oxidant gas mixture and the fuel into the combustion section of the reformer, the reformer comprising the plurality of reformer tubes containing the second reforming catalyst, each of the plurality of reformer tubes having an inlet end and an outlet end; and the reactor having the first inlet in downstream fluid flow communication with the prereformer for receiving the reformate from the prereformer, the reactor containing the reforming catalyst, the reactor having the first outlet in upstream fluid flow communication with the inlet ends of the plurality of reformer tubes, the reactor having the second inlet in downstream fluid flow communication with the outlet ends of the plurality of reformer tubes for receiving the reformed gas from the plurality of reformer tubes, the reactor having the second outlet for withdrawing the reformed gas at the second outlet temperature, and the reactor having a heat transfer surface area for exchanging heat indirectly between the reformate and the reformed gas, the reactor configured to pass the reformate co-currently to the reformed gas, wherein the heat transfer surface area is effective to decrease the temperature of the reformed gas from the second inlet temperature, the second inlet temperature ranging from 800° C. to 975° C. to the second outlet temperature, the second outlet temperature ranging from 675° C. to 925° C. and to maintain the first outlet temperature of the reformate between 575° C. to 725° C. when the reformate is introduced into the first inlet of the reactor at the first inlet temperature, the first inlet temperature ranging from 550° C. to 725° C.

2. The apparatus of claim 1 wherein the heat transfer surface area is effective to decrease the temperature of the reformed gas from the second inlet temperature, the second inlet temperature ranging from 800° C. to 975° C. to the second outlet temperature, the second outlet temperature ranging from 700° C. to 850° C. and to maintain the first outlet temperature of the reformate between 575° C. to 725° C. when the reformate is introduced into the first inlet of the reactor at the first inlet temperature, the first inlet temperature ranging from 600° C. to 700° C.

* * * * *